(12) United States Patent
Allard et al.

(10) Patent No.: US 6,650,406 B1
(45) Date of Patent: Nov. 18, 2003

(54) POLARIZATION DEPENDENT LOSS MEASUREMENT IN PHOTONIC DEVICES

(75) Inventors: Louis B. Allard, Ottawa (CA);
Jonathan Paradis, Boucherville (CA);
John C. Martinho, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 10/237,213

(22) Filed: Sep. 9, 2002

(51) Int. Cl.$^7$ .............................................. G01N 21/00
(52) U.S. Cl. ..................................................... 356/73.1
(58) Field of Search ........................ 356/73.1, 364–369; 385/11, 31, 32, 34, 37, 115; 250/225

(56) References Cited

U.S. PATENT DOCUMENTS

| | | | | |
|---|---|---|---|---|
| 5,371,597 A | * | 12/1994 | Favin et al. ................ | 356/367 |
| 6,211,957 B1 | * | 4/2001 | Erdogan et al. ............ | 356/364 |
| 6,449,033 B2 | * | 9/2002 | Marro et al. ................ | 356/73.1 |

* cited by examiner

Primary Examiner—Tu T. Nguyen
(74) Attorney, Agent, or Firm—Teitelbaum & MacLean; Neil Teitelbaum; Doug MacLean

(57) ABSTRACT

In order to calibrate an apparatus for measuring the polarization dependent loss of an optical device under test, a set of nominal polarization states of incident light are generated with a polarization generator. The incident light is then passed through a dot-product conserving polarization rotator at a first setting. A transmission characteristic is measured through a standard optical component with a known polarization dependent loss value for each polarization state. This step is repeated for a number of different settings of the polarization rotator. A polarization dependent loss value is calculated for the standard optical component based on the measured transmission characteristics at each polarization rotator setting. The calculated polarization dependent loss values are then processed to generate an aggregate error value. The aggregate error value is minimized by adjusting the values of the nominal polarization states to estimate the actual polarization states, which can then be used to calculate the polarization dependent loss of an optical device whose value is unknown.

24 Claims, 2 Drawing Sheets

POLARIZATION DEPENDENT LOSS MEASUREMENT IN PHOTONIC DEVICES

FIELD OF THE INVENTION

This invention relates to the field of photonics, and in particular to a method and apparatus for measuring polarization dependent loss (PDL) in photonic devices, such as single-mode fiber optic components.

BACKGROUND OF THE INVENTION

As a light wave propagates along a single-mode optical fiber, polarization-dependent attenuation occurs. This is known as polarization dependent loss (PDL). For many reasons it is important to be able to measure the PDL accurately for photonic devices, such as single mode optical fibers.

International standard IEC 61300-3-12, the contents of which are herein incorporated by reference, defines a method wherein a device under test (DUT) is illuminated by a small, typically four, set of well defined states of polarization. These measurements are followed by a matrix calculation to determine the PDL of the DUT.

One matrix calculation technique defined by the standard is known as the Mueller matrix technique. This technique provides an optical power representation of the performance of the DUT. The matrix representing the DUT and its optical properties is a square 16-element matrix, and the state of polarization of a light beam is described by a 4-element Stokes vector. The Stokes vector of the incident light multiplied by the Mueller matrix of the DUT gives the Stokes vector of the output light. Normally, the full Mueller matrix is not required to determine the PDL. The first row, which gives information on light intensity, is usually sufficient.

The problem with the Mueller technique is that it requires the four states of polarization to be accurately known. This is not always easy to achieve. In one method, the polarization light source generates three linear states of polarization and one circular. The circular state is generated by aligning a linear polarizer at 45° to a quarterwave plate. Precise alignment of the quarter waveplate is essential to produce circularly polarized light. In addition, when the PDL is calculated from at a wavelength that is different from the design wavelength of the quarterwave plate, it has to be assumed that the retardance behaviour of the quarter waveplate is linear, an assumption that is not always true.

SUMMARY OF THE INVENTION

The PDL of a DUT can be calculated by measuring the transmission coefficient of the DUT for four known states of polarization, provided said states do not all lie in the same plane when depicted in the Poincaré polarization space. The PDL of the DUT is invariant under rotation of those four states of polarization provided the mutual dot products of the states are conserved. A dot-product conserving rotation is typically observed when states of polarization are launched in a single mode optical fiber: the states of the output are different from those at the input, but the mutual dot products are conserved. Displacing the fiber further rotates the output states of polarization but conserves the mutual dot products.

In the accordance with the principles of the present invention, the measurements are performed on a standard component with a known polarization dependent loss using a number of different dot-product conserving rotations, for example thirty, and the results optimized numerically. Four polarization states are initially assumed and the polarization dependent loss of the DUT calculated for each of the different dot-product conserving rotations. By minimizing the error relative to the known polarization dependent loss value of the standard component, it is possible to estimate the actual four states of polarization incident on the device and use these estimated states to calibrate the measurement device, which can then be used to determine the loss of a DUT having an unknown PDL.

According to the present invention there is provided a method of calibrating an apparatus for measuring the polarization dependent loss of an optical device under test, comprising generating at least four nominal polarization states of incident light with a multiple state polarization generator; passing the incident light through a substantially dot-product conserving polarization rotator at a first setting; measuring a transmission characteristic of the incident light through a standard optical component with a known polarization dependent loss value at the first setting of the polarization rotator for each of the polarization states; repeating the previous step for a plurality of different settings of the polarization rotator; for each setting of the polarization rotator, calculating a polarization dependent loss value for the standard optical component based on the measured transmission characteristics and the nominal polarization states; processing the calculated polarization dependent loss values to generate an aggregate error value for all the polarization rotator settings based on the known polarization dependent loss value; and minimizing the aggregate error value by adjusting the values of the nominal polarization states to estimate the actual polarization states produced by the multiple state polarization generator.

The aggregate error function is preferably of the form:

$$f = \sum_{i=1}^{K} (PDL_i - PDL_{standard} + \delta)^2$$

where $PDL_{standard}$ represents the polarization dependent loss of the standard component, $\delta$ represents a perturbation in the polarization dependent loss of the standard component due to the presence of connectors, and K represents the number of settings of said polarization rotator.

It will be appreciated by one skilled in the art that the object is to minimize the error function, but the function does not necessarily have to be at the absolute minimum value in order to estimate the actual polarization states with sufficient accuracy for measurement. The intent is to optimize the function as much as possible or as is required for a particular application.

Typically four states are employed to calculate the PDL of the standard component using the Mueller calculation method. More states could be employed, but no advantage would be gained. By estimating the actual polarization states in this way, the accuracy of measurement can be considerably improved.

The invention also provides an arrangement for calibrating a polarization dependent loss measuring apparatus including a multiple state polarization generator for generating at least four polarization states of a beam of incident light, comprising a light source for generating the beam of incident light; a dot-product conserving polarization rotator having multiple settings for performing different rotations on the incident light; a transmission characteristic measuring device for measuring a transmission characteristic of the incident light through the optical device for each of the nominal polarization states at each setting of the polarization rotator; and a processor programmed to calculate a polarization dependent loss value at each setting of the polarization rotator from the measured transmission characteristics and nominal polarization states, generate an aggregate error value for all the settings of the polarization rotator based on a polarization dependent loss value of a standard component, and minimize the aggregate error value by adjusting the values of the nominal polarization states to estimate the actual polarization states produced by the multiple state polarization generator.

The multiple state generator is typically a four state generator producing the following four nominal states: left circularly polarized, horizontally polarized, vertically polarized, polarized at 45 degrees.

Once the measurement apparatus has been calibrated, the PDL of an optical component under test whose PDL is not known can be calculated by the Mueller method, using all four states, or alternatively by another suitable method, for example, the Jones method, in which case only three states are needed for the actual measurement of the PDL of the optical component.

The processor may consists of two parts, the first part calculating the estimated actual polarization states and the second part forming part of the measuring device to determine the polarization dependent loss.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
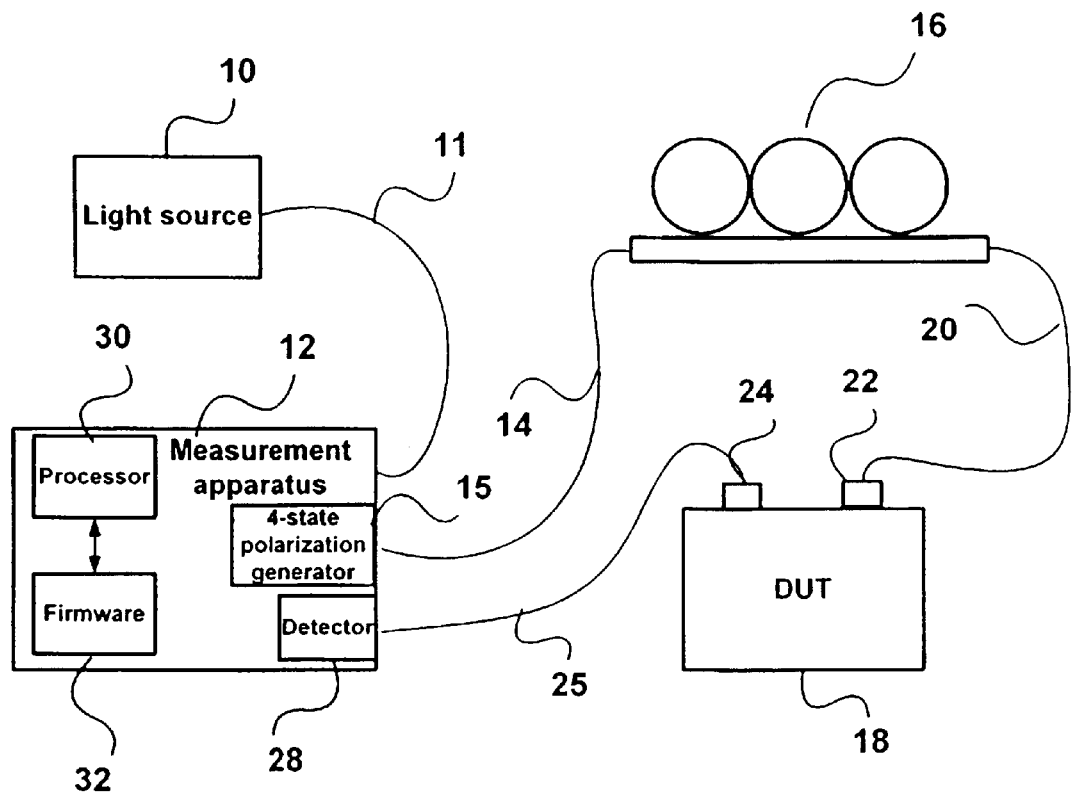
FIG. 1 is a schematic diagram of an apparatus for determining polarization dependent loss according to one embodiment of the invention.

The arrangement shown in FIG. 1 comprises a light source 10 capable of producing light having the spectral characteristics set forth in the IEC standard referred to above. Typically the spectral width should be less than 10 nm. The light is output to a single mode optical or a coupling system capable of launching the light to a single mode optical fiber.

The light from source 10 is transmitted through single mode optical fiber 11 to the instrument 12 for measuring the polarization dependent loss (PDL) of a device under test (DUT). Instrument 12 is capable of measuring the PDL of a DUT using the Mueller technique as set forth in the IEC standard. Such a device is known. For example, one such device is commercially available from JDS Uniphase Corporation under the trademark PS3.

The instrument 12 includes a four state polarization generator 15 that outputs light via single mode optic fiber 14 to a dot-product conserving polarization rotator 16. These four states of polarization have nominal values, for example, left circularly polarized, horizontally polarized, vertically polarized, polarized at 45 degrees. However, the actual states do not always precisely match the nominal values, and this gives rise to significant errors when the PDL is calculated in the instrument 12 based on these values.

The dot-product conserving polarization rotator is preferably of the type described in U.S. Pat. No. 4,398,090, the contents of which are incorporated herein by reference, although it will be understood that other types of polarization rotator capable of conserving the mutual dot products of the polarization states can be employed. The polarization rotator has a number of different settings corresponding to different amounts of rotation.

The output of the dot-product conserving polarization rotator 16 is input to a device under test (DUT) 18 through a single mode optical fiber 20 through input connector 22, and output through output connector 24 and optical fiber 25 back to the measuring instrument 12. The connectors 22, 24, which could be fusion splices or other types of connection, introduce a fixed, but unknown, perturbation in the measured PDL of the DUT 18. This perturbation is introduced as a constant in the formula used to calculate the actual polarization states.

Measuring instrument 12 includes a transmission coefficient detector 28 for measuring the transmission coefficient of the light returning from the DUT 18 for each state of polarization.

Processor 30 calculates the polarization dependent loss of the DUT 18 from the measured values of the transmission coefficients and the nominal polarization states stored in firmware 32 for various settings of the polarization rotator 16. At each setting of the polarization rotator, the incident light is passed through the DUT 18 one polarization state at time.

In order to calibrate the instrument 12 in accordance with the principles of the invention, a standard component with known polarization dependent loss is selected for the DUT 18. This component is connected respectively to the polarization controller 16 and measuring instrument 12 via connectors 22 and 24. These slightly perturb the PDL value of the standard component from its nominal value.

Next a series of PDL measurements are made with the instrument 12 at different settings of the polarization rotator 16. At each setting of the polarization rotator 16, the instrument 12 measures the transmission coefficient for each polarization state with the aid of detector 28. Typically four states are employed for each set, although more can be employed if desired. An exemplary set would be left circularly polarized, horizontally polarized, vertically polarized, polarized at 45 degrees.

The processor 30 then calculates the PDL value for each setting of the polarization rotator 16 based on the measured transmission coefficients for each of the nominal polarization states using the Mueller technique.

Figure 2:
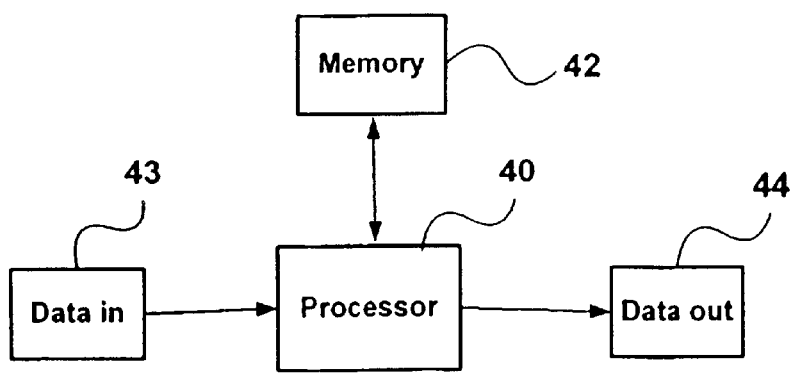
FIG. 2 is a block diagram of a processing for calculating the estimated actual polarization states.

In reality, the nominal values for the polarization states produced by the polarization generator 15 do not exactly match the actual values. In order to calculate the estimated actual values, processor 40, shown in FIG. 2, is programmed in memory 42 to minimize an aggregate error function based on the PDL values calculated from the measurements and the known values of the PDL for the standard component by adjusting the assumed nominal values of the polarization states produced by the four state generator 15. The processor 40 could conveniently be part of a personal computer.

The error function is of the form:

$$f = \sum_{i=1}^{K} (PDL_i - PDL_{standard} + \delta)^2$$

where $PDL_{standard}$ represents the polarization dependent loss of said standard optical component, $\delta$ represents a perturbation in the polarization dependent loss of said standard component introduced by the external connectors 22, 24, and K represents the number of settings of the polarization rotator 16, of which an exemplary number would be 30.

The processor 40 receives input data 43 and generates output data 44 representing the actual estimated polarization states of said four-state generator 15. The processor adjusts the individual polarization state values until the function is at a minimum or acceptably close thereto. These settings are then entered into the firmware 32 of the instrument 12 and can be used for future measurements of a DUT whose PDL properties are not known.

Figure 3:
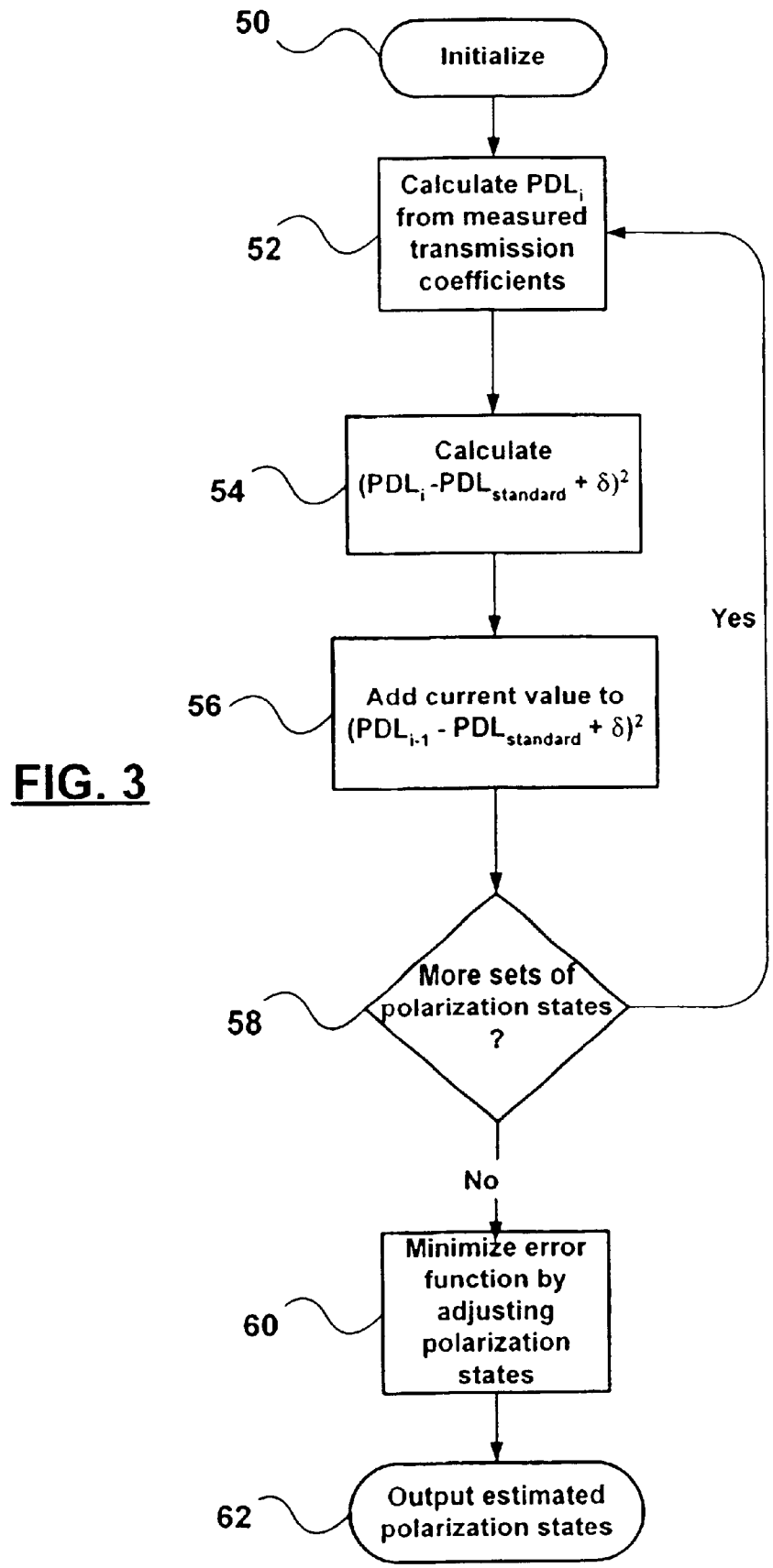
FIG. 3 is a flow chart illustrating the operation of the processor for calculating the estimated actual polarization states.

The operation of the processor 40 is shown in FIG. 3. After initialization at step 50, the processor calculates at step 52 the polarization dependent loss value for the $i^{th}$ setting of the polarization rotator based on the measured transmission coefficients for each polarization state produced by the four state generator 15 using the Mueller technique described in detail in the IEC standard referred to above.

At step 54, the processor 54 calculates the value $(PDL_i - PDL_{standard} + \delta)^2$, where $\delta$ is the perturbation in the known PDL introduced by the connectors 22, 24.

At step 56, the processor 40 adds the current value to the previous value, and at step 58 iterates the process if more settings of the polarization rotator 16 are available.

At step 60, the processor 40 minimizes the function $$f = \sum_{i=1}^{K} (PDL_i - PDL_{standard} + \delta)^2$$

by adjusting the assumed nominal values for the polarization states of said four-state generator 15. When a minimal value is found, it is assumed that the polarization states correspond to the actual polarization states of the polarization generator 15. These polarization states can then be loaded into the firmware 32 of the instrument 12.

The standard component used as the DUT 18 can then be replaced by a device whose PDL is not known, and the estimated polarization states used by the processor 30 to calculate the PDL of the DUT, thereby achieving an increase in accuracy. The PDL of the DUT 18 can be calculated using four states and the Mueller technique, although it is possible, once the apparatus 12 has been calibrated as described above, to use other techniques, such as the Jones technique, in which case the PDL measurement can be performed with only three of the estimated polarization states.

The described technique represents an important advance over the prior art because it is no longer critical that the indicated nominal settings on the four-state generator be accurately known. It is merely important that the nominal polarization states and rotation corresponding to a particular setting of the polarization rotator be consistent.

Many types of device can be tested using the methodology of the present invention, although it is particular applicable to the testing of single mode optical fiber components.

It will be appreciated by persons skilled in the art that many variations of the invention are possible within the scope and spirit of the appended claims.

What is claimed is:

1. A method of calibrating an apparatus for measuring the polarization dependent loss of an optical device under test, comprising:
   a) generating at least four nominal polarization states of incident light with a multiple state polarization generator;
   b) passing said incident light through a substantially dot-product conserving polarization rotator at a first setting;
   c) measuring a transmission characteristic of said incident light through a standard optical component with a known polarization dependent loss value at said first setting of said polarization rotator for each of said polarization states;
   d) repeating step c for a plurality of different settings of said polarization rotator;
   e) for each setting of said polarization rotator, calculating a polarization dependent loss value for said standard optical component based on said measured transmission characteristics and said nominal polarization states;
   f) processing said calculated polarization dependent loss values to generate an aggregate error value for all said polarization rotator settings based on said known polarization dependent loss value; and
   g) minimizing said aggregate error value by adjusting the values of said nominal polarization states to estimate the actual polarization states produced by said multiple state polarization generator.

2. A method as claimed in claim 1, wherein said aggregate error value is a quadratic function containing a term representing the difference between a polarization dependent loss value calculated in step e and said known polarization dependent loss value.

3. A method as claimed in claim 2, wherein said function represents the sum of the squares of said term for all said polarization rotator settings.

4. A method as claimed in claim 3, wherein said term further includes a constant that takes into account the perturbation in polarization dependent loss of said standard component introduced by external connectors.

5. A method as claimed in claim 4, wherein said transmission characteristic is the transmission coefficient.

6. A method as claimed in claim 5, wherein said polarization dependent loss values are calculated using a Mueller matrix technique.

7. A method as claimed in claim 1, wherein said multiple state polarization generator is a four-state polarization generator.

8. A method as claimed in claim 1, further comprising loading said estimated actual polarization states for selected settings of said polarization rotator into firmware in said measuring apparatus.

9. A method as claimed in claim 1, wherein said incident light is passed through said polarization rotator one state at a time.

10. A method of calibrating a device for measuring the polarization dependent loss of an optical device under test, comprising:
    a) generating at least four nominal polarization states of incident light with a multiple state polarization generator;
    b) passing said incident light through a substantially dot-product conserving polarization rotator at a first setting;

c) measuring a transmission characteristic of said incident light through a standard optical component with a known polarization dependent loss at said first setting of said polarization rotator for each of said polarization states;

d) repeating step c for a plurality of different settings of said polarization rotator;

e) for each setting of said polarization rotator, calculating a polarization dependent loss value $PDL_i$ based on said measured transmission characteristics and said nominal polarization states;

f) generating an error function of the form $$f = \sum_{i=1}^{K} (PDL_i - PDL_{standard} + \delta)^2$$

where $PDL_{standard}$ represents the polarization dependent loss of said standard optical component, $\delta$ represents a perturbation in the polarization dependent loss of said standard component introduced by external connectors, and K represents the number of settings of said polarization controller for which said transmission characteristics are measured; and g) minimizing said error function by adjusting the values of said nominal polarization states to estimate the actual polarization states produced by said multiple state generator.

11. A method as claimed in claim 10, wherein said transmission characteristic is the transmission coefficient.

12. A method as claimed in claim 11, wherein said multiple state generator is a four-state generator.

13. A method as claimed in claim 11, wherein said polarization dependent loss values are calculated using a Mueller matrix.

14. A method of determining the polarization dependent loss of an optical device under test, comprising:

a) generating at least four nominal polarization states of incident light with a multiple state polarization generator;

b) passing said incident light through a substantially dot-product conserving polarization rotator at a first setting;

c) measuring a transmission characteristic of said incident light through a standard optical component with a known polarization dependent loss value at said first setting of said polarization rotator for each of said polarization states;

d) repeating step c for a plurality of different setting of said polarization rotator;

e) for each set of nominal polarization states, calculating a polarization dependent loss value $PDL_i$ measured transmission characteristics and said nominal polarization states;

f) generating an error function of the form $$f = \sum_{i=1}^{K} (PDL_i - PDL_{standard} + \delta)^2$$

where $PDL_{standard}$ represents the polarization dependent loss of said standard optical component, $\delta$ represents a perturbation in the polarization dependent loss of said standard component introduced by external connectors, and K represents the number of settings of said polarization controller for which said transmission characteristics are measured;

g) minimizing said error function by adjusting the values of said nominal polarization states to estimate the actual polarization states;

h) replacing said standard component by an optical device with an unknown polarization dependent loss;

i) measuring the transmission characteristic through said optical device using the estimated actual polarization states determined in step g; and j) calculating the polarization dependent loss for said optical device using at least three of the estimated actual polarization states.

15. A method as claimed in claim 14, wherein said polarization dependent loss of said standard optical component is calculated using the Mueller matrix technique.

16. A method as claimed in claim 15, wherein the polarization dependent loss of said optical device is calculated using four said estimated actual polarization states by the Mueller matrix technique.

17. An arrangement for calibrating a polarization dependent loss measuring apparatus including a multiple state polarization generator for generating at least four polarization states of a beam of incident light, comprising:

a) a light source for generating said beam of incident light;

b) a dot-product conserving polarization rotator having multiple settings for performing different rotations on said incident light;

c) a transmission characteristic measuring device for measuring a transmission characteristic of said incident light through said optical device for each of said nominal polarization states at each setting of said polarization rotator; and d) a processor programmed to calculate a polarization dependent loss value at each setting of said polarization rotator from said measured transmission characteristics and said nominal polarization states, generate an aggregate error value for all said settings of said polarization rotator based on a polarization dependent loss value of a standard component, and minimize said aggregate error value by adjusting the values of said nominal polarization states to estimate the actual polarization states produced by said multiple state polarization generator.

18. An arrangement as claimed in claim 17, wherein said aggregate error value is a quadratic function containing a term representing the difference between a polarization dependent loss value calculated by said processor and said polarization dependent loss value of a standard component.

19. An arrangement as claimed in claim 18, wherein said function represents the sum of the squares of said term for all said settings of said polarization rotator.

20. An arrangement as claimed in claim 18, wherein said transmission characteristic is the transmission coefficient.

21. An arrangement as claimed in claim 20, wherein said processor calculates said polarization dependent loss values using a Mueller matrix.

22. An arrangement as claimed in claim 21, wherein said processor generates an error function of the form $$f = \sum_{i=1}^{K} (PDL_i - PDL_{standard} + \delta)^2$$

where $PDL_{standard}$ represents the polarization dependent loss of a standard component, $\delta$ represents a perturbation in the polarization dependent loss of said standard component, and K represents the number of said settings of said polarization rotator.

23. An arrangement as claimed in claim 22, wherein said processor outputs said estimated actual polarization states to firmware in said polarization dependent loss measurement apparatus.

24. An arrangement as claimed in claim 17, wherein said polarization controller is a four polarization state controller.

* * * * *